(12) United States Patent
Kinjo et al.

(10) Patent No.: US 10,916,980 B2
(45) Date of Patent: Feb. 9, 2021

(54) ROTOR WITH FIRST AND SECOND ROTATING BODY STACKED VERTICALLY HAVING CORE SURFACES AXIALLY ARRANGED WITH DIFFERENT CURVATURE RADIUSES

(71) Applicant: Nidec Corporation, Kyoto (JP)

(72) Inventors: Hideyuki Kinjo, Kyoto (JP); Takayuki Migita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/474,231

(22) PCT Filed: Dec. 22, 2017

(86) PCT No.: PCT/JP2017/046059
§ 371 (c)(1),
(2) Date: Jun. 27, 2019

(87) PCT Pub. No.: WO2018/123840
PCT Pub. Date: Jul. 5, 2018

(65) Prior Publication Data
US 2019/0356183 A1      Nov. 21, 2019

(30) Foreign Application Priority Data

Dec. 28, 2016   (JP) ................................ 2016-257147

(51) Int. Cl.
*H02K 1/27*   (2006.01)
*H02K 1/12*   (2006.01)

(52) U.S. Cl.
CPC ................. *H02K 1/27* (2013.01); *H02K 1/12* (2013.01)

(58) Field of Classification Search
CPC ........... H02K 2201/06; H02K 2201/09; H02K 16/00; H02K 16/02; H02K 1/27;
(Continued)

(56) References Cited

U.S. PATENT DOCUMENTS

| 8,247,940 B2 * | 8/2012 | Hino ........................ B60L 1/02 310/156.47 |
| 9,143,013 B2 * | 9/2015 | Yamada ................. H02K 16/02 |

(Continued)

FOREIGN PATENT DOCUMENTS

| CN | 102257702 A | 11/2011 |
| JP | 2004-208341 A | 7/2004 |

(Continued)

OTHER PUBLICATIONS

JP2004215395A English Translation.*
Official Communication issued in International Patent Application No. PCT/JP2017/046059, dated Mar. 20, 2018.

*Primary Examiner* — Maged M Almawri
(74) *Attorney, Agent, or Firm* — Keating & Bennett

(57) ABSTRACT

A rotor includes a rotor core having a cylindrical shape with a central axis as a center thereof and magnets arranged in a circumferential direction. The rotor core includes an inner side core portion positioned farther inward than the magnet in a radial direction, a first outer side core portion positioned farther outward than the magnet in the radial direction and disposed on a first side in an axial direction, and a second outer side core portion positioned farther outward than the magnet in the radial direction and disposed on a second other side in the axial direction. A distance between the central axis and an outer side surface of the first outer side core portion changes in the circumferential direction, a distance between the central axis and an outer side surface of the second outer side core portion changes in the circumferential direction. In a plan view, a first top portion positioned at an outermost position of the first outer side core portion in the radial direction and a second top portion positioned at an outermost position of the second outer side core portion in the radial direction are located at positions different from each other in the circumferential direction.

8 Claims, 13 Drawing Sheets

(58) Field of Classification Search
CPC ...... H02K 1/2726; H02K 1/274; H02K 1/276; H02K 1/12; H02K 1/24; H02K 1/2706–278; H02K 1/28; H02K 1/2786; H02K 1/30
USPC ............ 310/156.43, 156.38–156.47, 156.53, 310/156.57
See application file for complete search history.

(56) References Cited

U.S. PATENT DOCUMENTS

| | | | | |
|---|---|---|---|---|
| 9,300,176 | B2* | 3/2016 | Saito | H02K 1/24 |
| 9,812,913 | B2* | 11/2017 | Saito | B60L 15/025 |
| 9,912,204 | B2* | 3/2018 | Totoki | H02K 1/276 |
| 2002/0171309 | A1* | 11/2002 | Wakui | H02K 1/2766 |
| | | | | 310/156.48 |
| 2004/0207280 | A1* | 10/2004 | Luo | H02K 1/278 |
| | | | | 310/156.47 |
| 2005/0121990 | A1* | 6/2005 | Kaneko | H02K 1/276 |
| | | | | 310/156.47 |
| 2009/0267437 | A1* | 10/2009 | Chai | H02K 1/278 |
| | | | | 310/156.25 |
| 2010/0176680 | A1* | 7/2010 | Murakami | H02K 1/278 |
| | | | | 310/156.38 |
| 2010/0244609 | A1* | 9/2010 | Takahata | H02K 1/276 |
| | | | | 310/156.53 |
| 2011/0309706 | A1 | 12/2011 | Takahashi et al. | |
| 2013/0113323 | A1* | 5/2013 | Yamada | H02K 1/2706 |
| | | | | 310/156.07 |
| 2015/0270750 | A1* | 9/2015 | Totoki | H02K 1/278 |
| | | | | 310/156.25 |
| 2015/0318773 | A1* | 11/2015 | Kim | H02K 21/029 |
| | | | | 310/156.24 |
| 2017/0288517 | A1* | 10/2017 | Ikeno | H02K 21/16 |
| 2019/0006916 | A1* | 1/2019 | Peterson | F25B 31/006 |
| 2019/0363594 | A1* | 11/2019 | Qin | H02K 1/278 |

FOREIGN PATENT DOCUMENTS

| | | |
|---|---|---|
| JP | 2004-215395 A | 7/2004 |
| JP | 2012-085434 A | 4/2012 |

* cited by examiner

ROTOR WITH FIRST AND SECOND ROTATING BODY STACKED VERTICALLY HAVING CORE SURFACES AXIALLY ARRANGED WITH DIFFERENT CURVATURE RADIUSES

CROSS REFERENCE TO RELATED APPLICATIONS

This is the U.S. national stage of PCT Application No. PCT/JP2017/046059, filed on Dec. 22, 2017, and priority under 35 U.S.C. § 119(a) and 35 U.S.C. § 365(b) is claimed from Japanese Application No. 2016-257147, filed Dec. 28, 2016; the entire disclosures of which are incorporated herein by reference.

FIELD OF THE INVENTION

The present disclosure relates to a rotor and a motor.

BACKGROUND

Conventionally, a configuration in which pulsating torque while driving a motor is reduced, and rotation is stabilized has been adopted in rotors used for motors. For example, a related art discloses a configuration in which pulsating torque under load is reduced by disposing permanent magnets on an outer circumferential surface of a rotor iron core and making the thickness of the permanent magnets non-uniform in a circumferential direction.

However, in a rotor having the above-described configuration, since the thickness of permanent magnets disposed on an outer circumferential surface of a rotor iron core is non-uniform in a circumferential direction, variations in torque generated while a motor including the rotor rotates may occur due to variations generated in the direction of generated magnetic flux or the like.

SUMMARY

According to an example embodiment of the present disclosure, a rotor includes a rotating body disposed along a central axis. The rotating body includes a rotor core having a cylindrical shape with the central axis as a center thereof and a plurality of magnets arranged in a circumferential direction. The rotor core includes an inner side core portion positioned farther inward than the magnet in a radial direction, a first outer side core portion positioned farther outward than the magnet in the radial direction and disposed on a first side in an axial direction, and a second outer side core portion positioned farther outward than the magnet in the radial direction and disposed on a second other side in the axial direction. A distance between the central axis and an outer side surface of the first outer side core portion changes in the circumferential direction, and a distance between the central axis and an outer side surface of the second outer side core portion changes in the circumferential direction. In a plan view, a first top portion positioned at an outermost position of the first outer side core portion in the radial direction and a second top portion positioned at an outermost position of the second outer side core portion in the radial direction are located at positions different from each other in the circumferential direction.

The above and other elements, features, steps, characteristics and advantages of the present disclosure will become more apparent from the following detailed description of the example embodiments with reference to the attached drawings.

DETAILED DESCRIPTION

Figure 1:
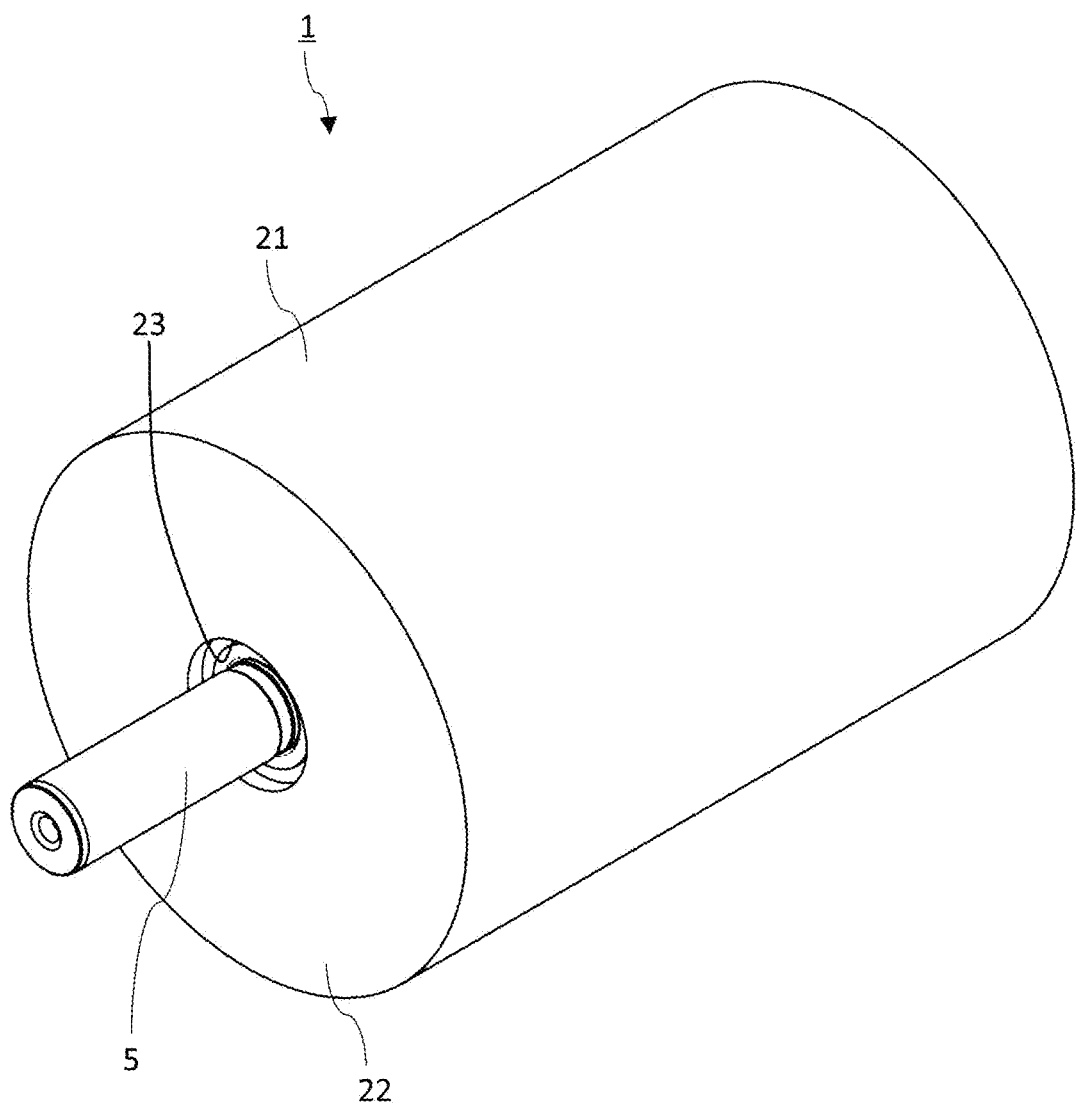
FIG. 1 is an external perspective view of a motor according to an example embodiment of the present disclosure.

Hereinafter, example embodiments and modified examples of the present disclosure will be described with reference to the drawings. However, the example embodiments and the modified examples described below are merely examples of the present disclosure and are not intended to be construed as limiting the technical scope of the present disclosure. In each drawing, when the same components are denoted by the same reference numerals, the description thereof may be omitted.

In the following description, a central axis of rotation of a rotor in a motor is defined as "C". The direction in which the central axis C extends is defined as a "vertical direction". However, the vertical direction in the present specification is a term used merely for the purpose of explanation and does not limit an actual positional relationship or direction. That is, a gravity direction is not necessarily a downward direction. Further, in the present specification, a direction parallel to a rotation axis of the motor is referred to as an "axial direction", a direction orthogonal to the rotation axis of the motor is referred to as a "radial direction", and a direction along a circular arc about the rotation axis of the motor is referred to as a "circumferential direction", respectively.

Further, in the present specification, "extending in the axial direction" includes a state of extending in a direction inclined in a range of fewer than 45 degrees with respect to the axial direction in addition to a state of strictly extending in the axial direction. Likewise, in the present specification, "extending in the radial direction" includes a state of extending in a direction inclined in a range of fewer than 45 degrees with respect to the radial direction in addition to a state of strictly extending in the radial direction. Further, the term "straight line" includes a straight line segment without unevenness, and also a line segment with some unevenness or curvature. Also, the term "the same" or "equal" includes not only a component which is completely the same but also a component having some difference in a degree sufficient to achieve the gist of the present disclosure.

Figure 2:
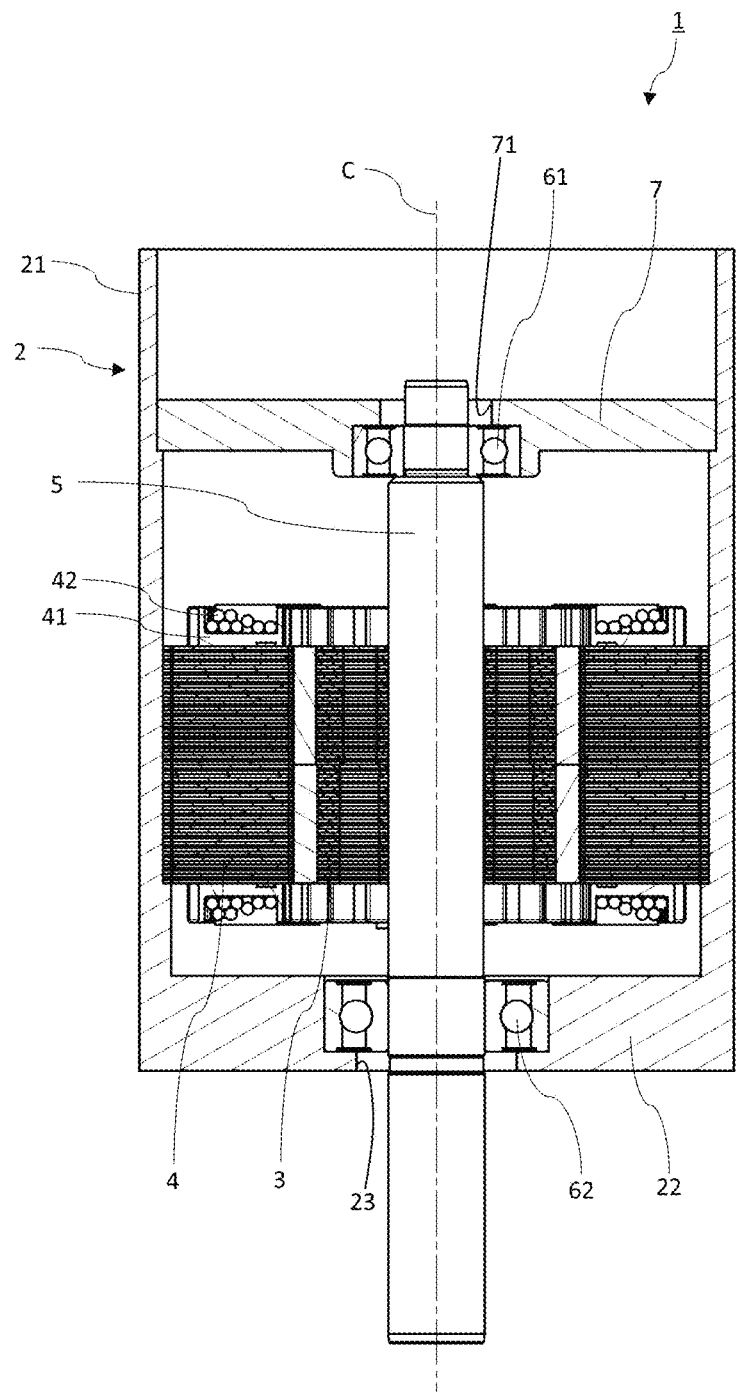
FIG. 2 is a cross-sectional view of a motor according to an example embodiment of the present disclosure.

A motor of the present example embodiment is used as, for example, a motor for electric power steering or the like. FIG. 1 is an external perspective view of a motor 1 of the present example embodiment. FIG. 2 is a cross-sectional view of the motor 1. As shown in FIGS. 1 and 2, the motor 1 includes a housing 2, a rotor 3, a stator 4, a shaft 5, an upper bearing 61, a lower bearing 62, and a bearing holder 7. As shown in FIG. 1, a housing cylinder 21, a housing bottom 22, and the shaft 5 are visually recognized from the outside.

As shown in FIG. 2, the housing 2 includes the housing cylinder 21 and the housing bottom 22. The housing 2 is made of a conductive material such as metal. The housing 2 accommodates the rotor 3, the stator 4, the shaft 5, the upper bearing 61, the lower bearing 62, and the bearing holder 7. Here, the term "accommodate" includes both a case in which the whole of an object to be accommodated is positioned inside the housing and a case in which a part of the object to be accommodated is positioned inside the housing. The housing 2 is open upward.

The housing cylinder 21 has a cylindrical shape with a central axis C as a center thereof. The bearing holder 7 having a substantially circular plate shape is disposed in the housing cylinder 21. An inner circumferential surface of the housing cylinder 21 is in contact with an outer circumferential surface of the bearing holder 7 and an outer circumferential surface of the stator 4. The housing cylinder 21 is fixed to the bearing holder 7 and the stator 4.

Further, the housing cylinder 21 may not necessarily have the cylindrical shape and may have any shape such as a box shape as long as the stator 4 and the bearing holder 7 can be fixed to the inner circumferential surface thereof. Further, the housing cylinder 21 may have a shape combining a cylindrical shape and other shapes such as a box shape. The inner circumferential surface of the housing cylinder 21 may not be in contact with the stator 4 and the bearing holder 7 on the entire circumference, and only a part of the inner circumferential surface may be in contact with the stator 4 and the bearing holder 7. Further, it is not necessary to have a configuration in which the housing cylinder 21 and the bearing holder 7 are in contact with each other, and for example, a configuration in which the bearing holder 7 is disposed on an upper side of the housing cylinder 21 may be adopted. In other words, the housing 2 may not necessarily accommodate the bearing holder 7.

The housing bottom 22 is disposed below the stator 4. The housing bottom 22 supports the lower bearing 62. The housing bottom 22 includes an output shaft hole 23 which passes through the housing bottom 22 in an axial direction and through which the shaft 5 is inserted and passed.

Further, in the present example embodiment, the housing 2 is a separate member from the bearing holder 7. The housing cylinder 21 and the bearing holder 7 may be a single member, and the housing bottom 22 may be a separate member. Further, each of the housing cylinder 21, the housing bottom 22, and the bearing holder 7 may be a separate member.

The bearing holder 7 has a circular plate shape. The bearing holder 7 is disposed above the stator 4. The bearing holder 7 includes an opening 71 around the central axis C. The opening 71 is a through-hole passing through the bearing holder 7 in the axial direction. At least a part of the shaft 5 is positioned on an inner side of the opening 71. The bearing holder 7 supports the upper bearing 61. The outer circumferential surface of the bearing holder 7 is in contact with the inner circumferential surface of the housing cylinder 21, and the bearing holder 7 is fixed to the housing cylinder 21. In the present example embodiment, the bearing holder 7 is fixed to the housing cylinder 21 by shrink fitting. Further, the bearing holder 7 may be fixed to the housing cylinder 21 by other methods such as press fitting.

The stator 4 is disposed inside the housing 2 and outside the rotor 3 in a radial direction so as to face the rotor 3. That is, the stator 4 surrounds the rotor 3 in a circumferential direction. The stator 4 includes a stator core (not shown), an insulator 41, and a coil 42. The stator core is formed of a laminated steel plate in which electromagnetic steel plates are laminated in the axial direction. In the present example embodiment, the stator core has an annular shape with the central axis C as a center thereof. The insulator 41 is formed of an insulator such as resin and attached to the stator core. The coil 42 is formed by a conducting wire wound around the stator core through the insulator 41. The outer circumferential surface of the stator 4 is fixed to an inner circumferential surface of the housing 2.

The upper bearing 61 and the lower bearing 62 of the motor 1 are ball bearings. The upper bearing 61 and the lower bearing 62 rotatably support the shaft 5 in the circumferential direction with the central axis C as a center thereof. The upper bearing 61 is supported by the bearing holder 7. The lower bearing 62 is supported by the housing bottom 22. The upper bearing 61 and the lower bearing 62 may be other types of bearings than ball bearings.

In the present specification, the upper bearing 61 and the lower bearing 62 are collectively referred to as "bearings". That is, the bearings, which include the upper bearing 61 and the lower bearing 62, rotatably support the shaft 5 and the rotor 3.

Figure 3:
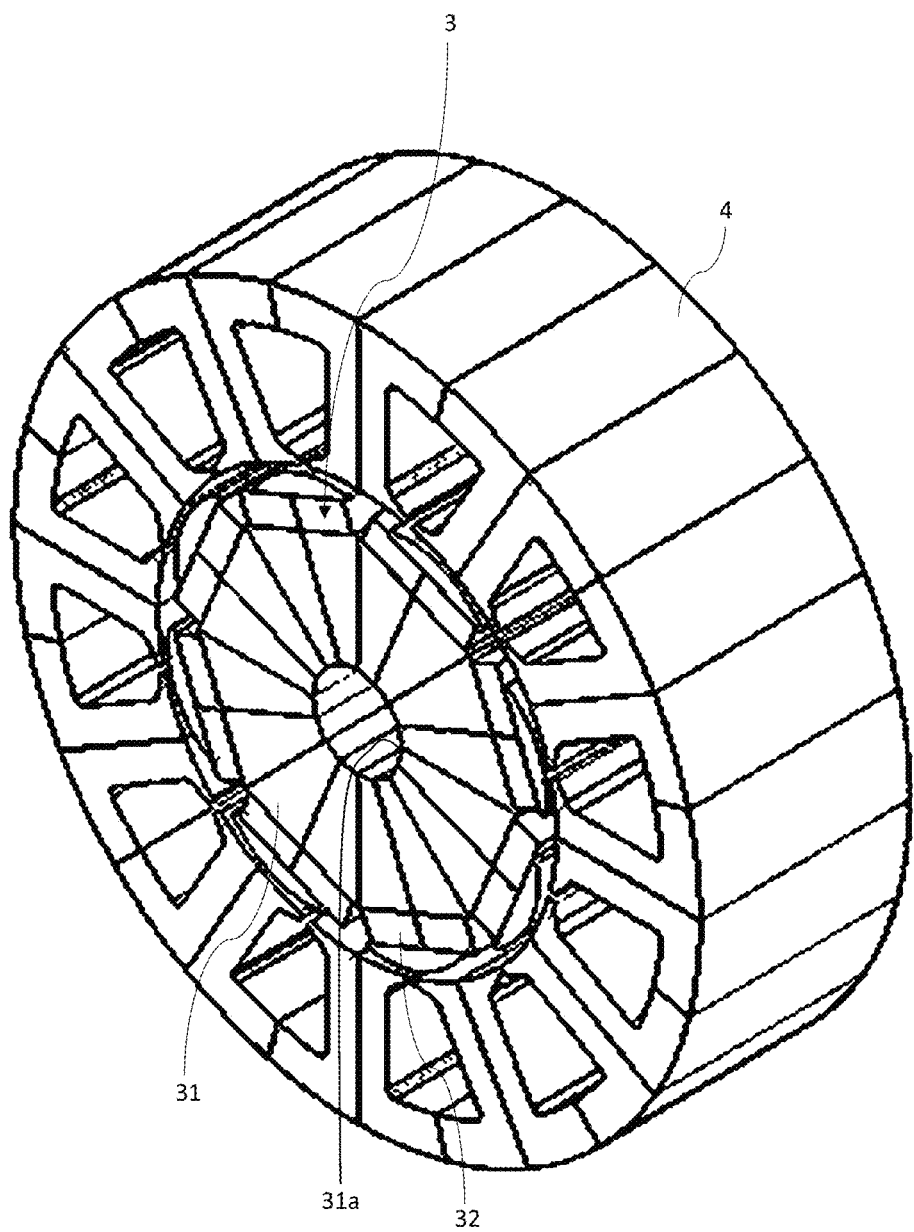
FIG. 3 is an external perspective view of a rotor and a stator according to an example embodiment of the present disclosure.
Figure 4:
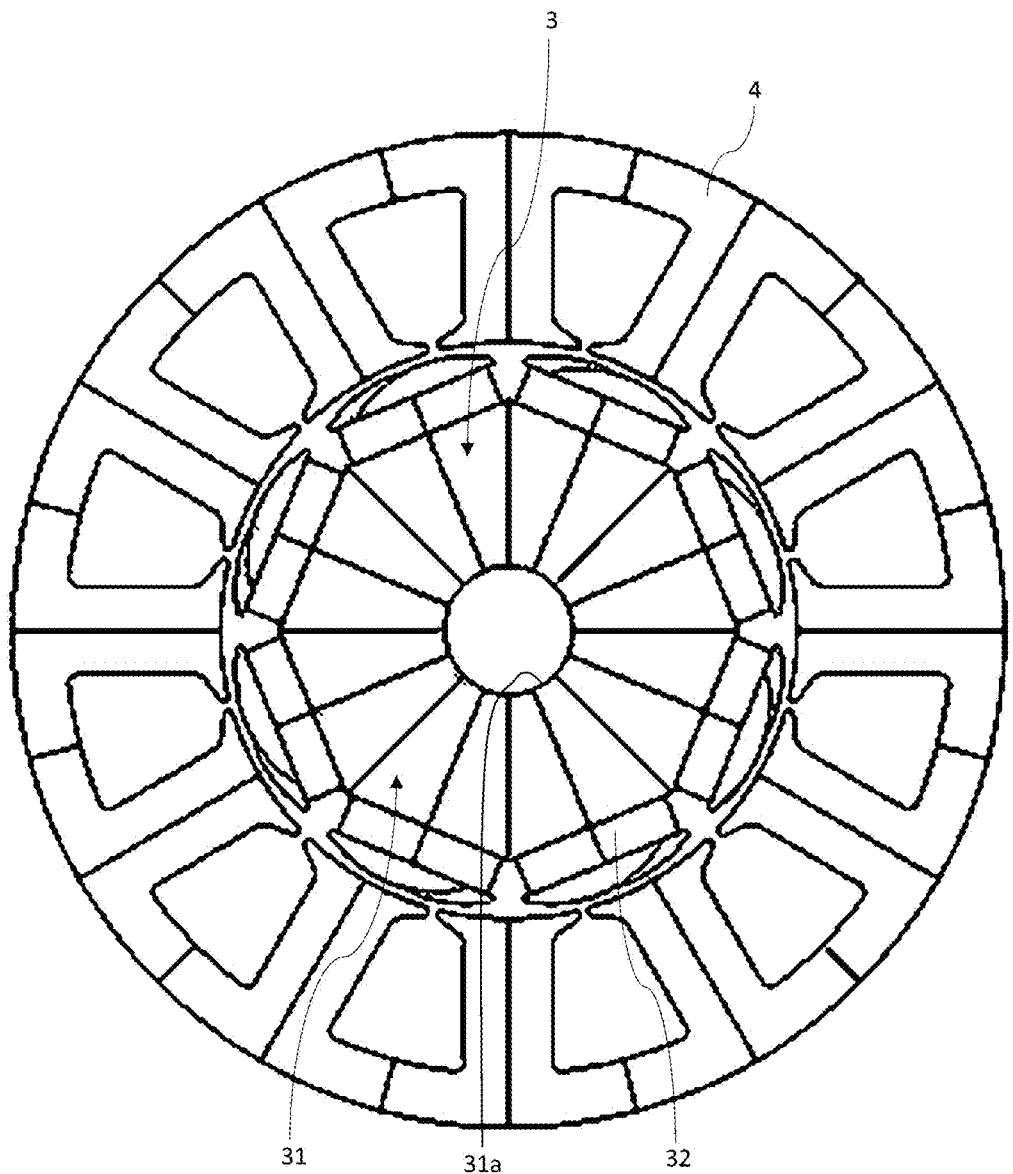
FIG. 4 is a plan view of a rotor and a stator according to an example embodiment of the present disclosure.

The rotor 3 is disposed along the central axis C extending in a vertical direction and is attached to an outer circumference of the shaft 5. FIG. 3 is an external perspective view of the rotor 3 and the stator 4 of the present example embodiment. FIG. 4 is a plan view of the rotor 3 and the stator 4 of the present example embodiment. As shown in FIGS. 3 and 4, an outer side surface of the rotor 3 faces an inner side surface of the stator 4.

Figure 5:
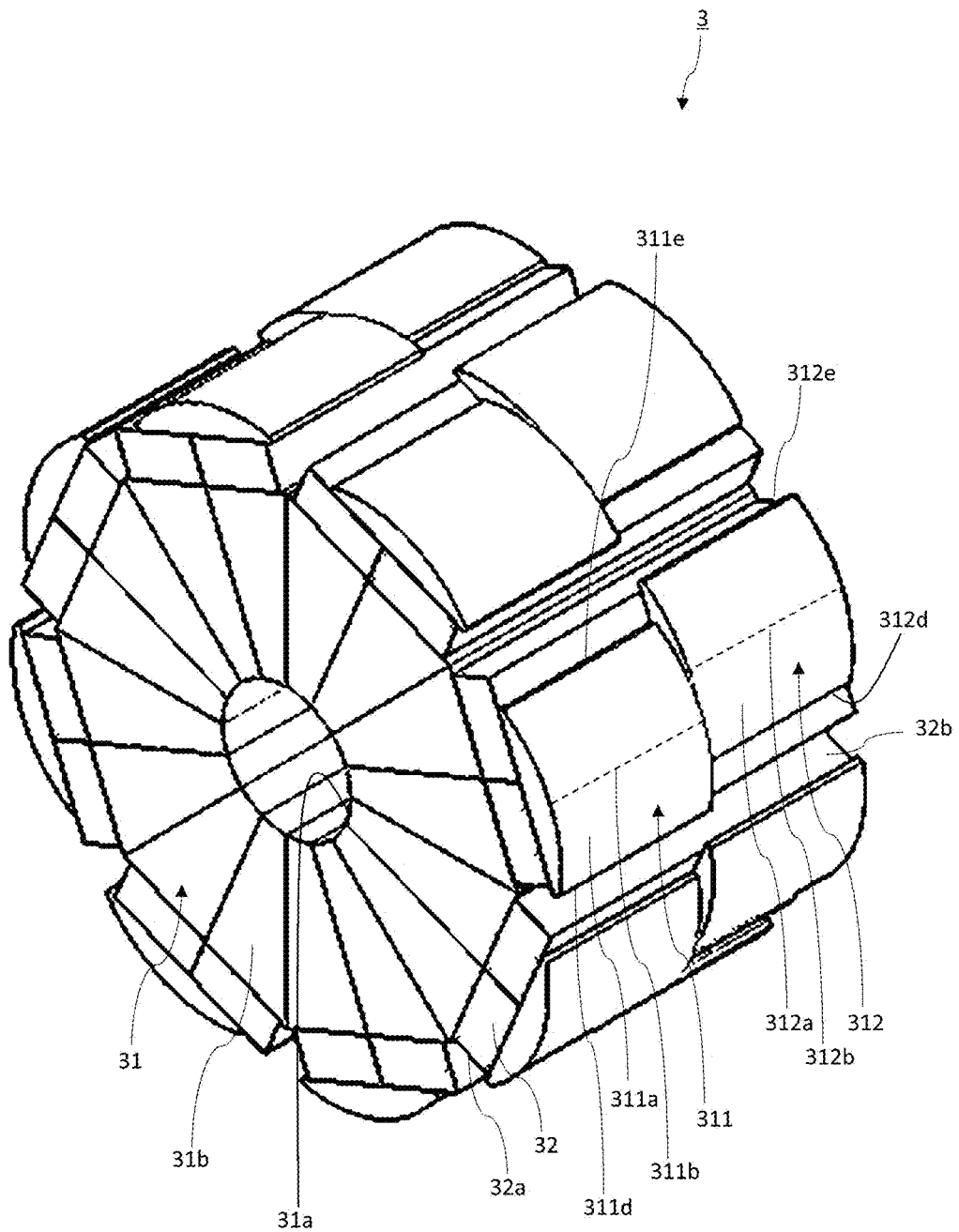
FIG. 5 is an external perspective view of a rotor according to an example embodiment of the present disclosure.

FIG. 5 is an external perspective view of the rotor 3. As illustrated in the drawing, the rotor 3 includes rotating bodies arranged along the central axis C. The rotating bodies include rotor cores 31 and magnets 32.

The rotor core 31 includes a shaft through hole 31a having a circular cross-section at a position including the central axis C. The shaft 5 is inserted into the shaft through hole 31a.

The rotor core 31 includes an inner side core portion 31b, a first outer side core portion 311, and a second outer side core portion 312. The shaft through hole 31a is positioned on the inner side core portion 31b. The inner side core portion 31b has a cylindrical shape, for example, a polygonal prism shape. A cross section of the inner side core portion 31b in a plane perpendicular to the axial direction has, for example, a polygonal shape such as a regular octagonal shape. However, the inner side core portion 31b is not necessarily limited to the polygonal prism shape and may have a cylindrical shape or other shapes. However, in order to stabilize magnetic flux generated from the magnet 32 by forming the shape of the magnet 32 into a shape having a small curved portion such as a rectangular parallelepiped shape, the inner side core portion 31b may be formed in a polygonal prism shape. An inner side surface of the magnet 32 is in contact with an outer side surface of the inner side core portion 31b.

When viewed in plan in a plane perpendicular to the axial direction, the magnet 32 includes an inner side surface on an inner side in the radial direction and an outer side surface on an outer side in the radial direction. The magnet 32 includes a first circumferential side surface 32a and a second circumferential side surface 32b as side surfaces in the circumferential direction. An inner side surface 311c of the first outer side core portion 311 and an inner side surface 312c of the second outer side core portion 312 are in contact with the outer side surface of the magnet 32. The inner side surface of the magnet 32 is bonded to the outer side surface of the inner side core portion 31b. Further, the outer side surface of the magnet 32 is bonded to the inner side surface 311c of the first outer side core portion 311 and the inner side surface 312c of the second outer side core portion 312. Instead of bonding, a connection may also be made using a connector such as a holder for holding the rotor core 31 and the magnet 32. Further, instead of the connector such as the holder, the rotor core 31 and the magnet 32 may be sealed by resin molding or the like.

The magnet 32 is a permanent magnet having a rectangular parallelepiped shape, and the first outer side core portion 311 and the second outer side core portion 312 are disposed on the outer side surface of the magnet 32. On the other hand, in a configuration in which positions of the magnets arranged on a surface of the rotor core are shifted in the circumferential direction, separate magnets are vertically disposed in the axial direction. In the rotor 3, since the integral magnets 32 are vertically disposed in the axial direction, variations in the magnetic flux are suppressed as compared with the configuration in which the separate magnets are vertically disposed in the axial direction. Thus, cogging included in torque generated while driving the motor 1 including the rotor 3 may be reduced, thereby stabilizing rotational operation. Further, processing costs of the magnet may be reduced by forming the magnet into a shape that is easy to process, such as a rectangular parallelepiped shape.

Further, since it is not necessary to process surfaces of the magnet of the rectangular parallelepiped shape, the magnet may be manufactured with higher dimensional accuracy as compared with a case in which a plane surface is processed into a curved surface. Accordingly, a spacing distance between the rotor 3 and the stator 4 may be adjusted more accurately. Thus, variations in the torque generated in the motor 1 including the rotor 3 may be suppressed.

The first outer side core portion 311 is positioned above the second outer side core portion 312 in the axial direction, and the second outer side core portion 312 is positioned below the first outer side core portion 311 in the axial direction. The first outer side core portion 311 and the second outer side core portion 312 may be in contact with or spaced apart from each other in the axial direction. The number of the magnets 32, the number of the first outer side core portion 311, and the number of the second outer side core portion 312 are equal to each other. However, when the first outer side core portion 311 and the second outer side core portion 312 have the same characteristics, such as when adopting a so-called pseudo salient pole configuration in which a rotor core positioned between adjacent magnets constitutes a magnetic pole, the number of the first outer side core portion 311 and the number of the second outer side core portion 312 may not necessarily be the same.

Figure 6:
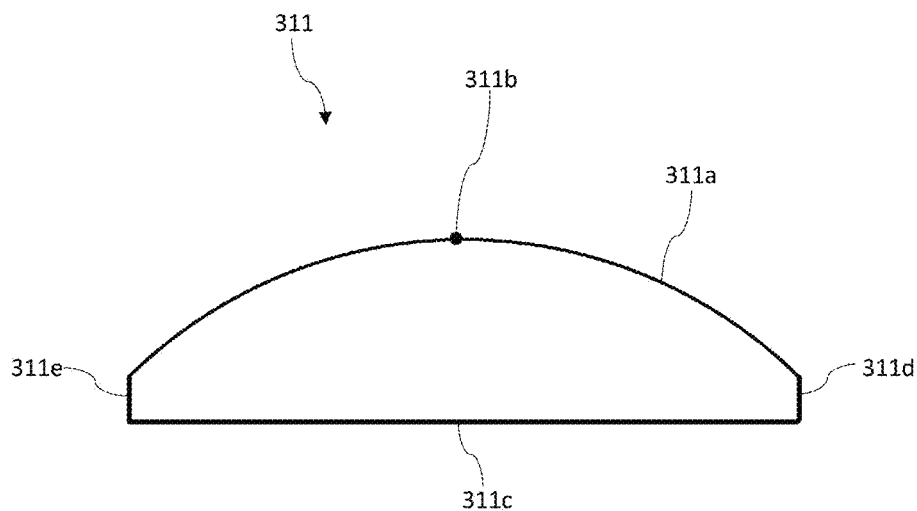
FIG. 6 is a plan view of an outer side core portion according to an example embodiment of the present disclosure.

FIG. 6 is a plan view of the first outer side core portion 311 when viewed from the axial direction. Since a shape of the second outer side core portion 312 is the same as a shape of the first outer side core portion 311, a description of the first outer side core portion 311 will be referred to as a description of the second outer side core portion 312, and an individual specific description of the second outer side core portion 312 will not be included.

The first outer side core portion 311 extends in the axial direction in the shape shown in FIG. 6. That is, the first outer side core portion 311 has the same shape in a plane orthogonal to the axial direction. As shown in FIG. 6, the first outer side core portion 311 includes an outer side surface 311a, the inner side surface 311c, a first circumferential side surface 311d, and a second circumferential side surface 311e. A first top portion 311b is positioned at the outermost position of the outer side surface 311a of the first outer side core portion 311 in the radial direction. As shown in FIG. 5, the first top portion 311b extends in the axial direction. In a plan view, the first outer side core portion 311 is linearly symmetrical about a straight line in the circumferential direction including the first top portion 311b. Each of the first circumferential side surface 311d and the second circumferential side surface 311e is formed as a straight line. The first circumferential side surface 311d faces and is spaced apart from the second circumferential side surface 311e of the first outer side core portion 311, which is disposed adjacent thereto, in the circumferential direction. However, the first outer side core portion 311 may not necessarily be linearly symmetrical about the straight line in the circumferential direction including the first top portion 311b. Further, the first circumferential side surface 311d and the second circumferential side surface 311e may not necessarily be formed as straight lines.

The outer side surface 311a of the first outer side core portion 311 is curved in a circular arc shape when viewed in plan in a plane orthogonal to the axial direction. That is, the outer side surface 311a is a curved surface having a circular arc-shaped cross-section. The outer side surface 312a has a predetermined curvature radius R1. The curvature radius R1 is different from a distance R from the central axis C to the outermost circumference position of the rotor core 31. Further, when viewed in plan in a plane perpendicular to the axial direction, a curvature center of the outer side surface 312a is at a position different from the central axis C. In other words, a distance of the outer side surface 311a of the first outer side core portion 311 to the central axis C changes in the circumferential direction.

As shown in FIG. 5, the second outer side core portion 312 includes an outer side surface 312a, a second top portion 312b, a first circumferential side surface 312d, and a second circumferential side surface 312e, like the first outer side core portion 311. The outer side surface 312a of the second outer side core portion 312 is curved in a circular arc shape when viewed in plan in a plane orthogonal to the axial direction. That is, the outer side surface 312a is a curved surface having a circular arc-shaped cross-section. Like the outer side surface 311a of the first outer side core portion 311, the outer side surface 312a has a predetermined curvature radius R1.

In a plan view, positions of the first top portion 311b of the first outer side core portion 311 and the second top portion 312b of the second outer side core portion 312 are different from each other in the circumferential direction. That is, as shown in FIG. 5, the first top portion 311b extending in the axial direction and the second top portion 312b extending in the axial direction have positions different from each other in the circumferential direction. Further, a distance of the outer side surface 312a of the second outer side core portion 312 to the central axis changes in the circumferential direction.

With the above-described configuration, the magnetic flux generated when the motor 1 including the rotor 3 is driven may be shifted in the axial direction, and thus cogging during rotation may be suppressed.

The first top portion 311b of the first outer side core portion 311 is disposed on one side in the circumferential direction with respect to a center portion of the magnet 32 in the circumferential direction, which is in contact with the first outer side core portion 311. On the other hand, the second top portion 312b of the second outer side core portion 312 is disposed on the other side in the circumferential direction with respect to the center portion of the magnet 32 in the circumferential direction, which is in contact with the second outer side core portion 312. That is, with reference to the magnet 32, the first top portion 311b is positioned on the one side in the circumferential direction, and the second top portion 312b is positioned on the other side in the circumferential direction.

As shown in FIG. 5, a length of the inner side surface 311c of the first outer side core portion 311 in the circumferential direction is shorter than a length of the outer side surface of the magnet 32 in the circumferential direction, which is in contact with the inner side surface 311c. The first outer side core portion 311 overlaps the circumferential side surface 32a on one side of the magnet 32 in the radial direction. Meanwhile, the second circumferential side surface 311e of the first outer side core portion 311 is positioned nearer to the center portion of the magnet 32 in the circumferential direction than the circumferential side surface 32b on the other side of the magnet 32.

Likewise, as shown in FIG. 5, a length of the inner side surface 312c of the second outer side core portion 312 in the circumferential direction is shorter than the length of the outer side surface of the magnet 32 in the circumferential direction, which is in contact with the inner side surface 312c. The first circumferential side surface 312d of the second outer side core portion 312 is positioned nearer to the center portion of the magnet 32 in the circumferential direction than the circumferential side surface 32a on the one side of the magnet 32. Meanwhile, the second outer side core portion 312 overlaps the second circumferential side surface 32b on the other side of the magnet 32 in the radial direction.

That is, in the first outer side core portion 311 and the second outer side core portion 312, the circumferential side surface of the magnet 32 and the circumferential side surface overlapping in the radial direction are different from each other.

A distance by which the first outer side core portion 311 protrudes to the one side in the circumferential direction with respect to the magnet 32 is substantially equal to a distance by which the second outer side core portion 312 protrudes to the other side in the circumferential direction with respect to the magnet 32. Thus, a plan view of the rotor 3 viewed from one side in the axial direction is the same as the plan view of the rotor 3 viewed from the other side in the axial direction. Here, a shape of the first outer side core portion 311 viewed from the one side in the axial direction is the same as a shape of the second outer side core portion 312 viewed from the other side in the axial direction.

The motor 1 is not limited to the above-described example embodiment, and various forms that can be considered from the above-described example embodiments are also included. For example, a rotor included in the motor 1 may be configured as modified examples below. In the modified examples below, descriptions of the same configurations and functions as those of the example embodiment will be omitted, and differences from the example embodiment will be mainly described.

A rotor core 33 of the rotor of the present modified example is mainly different from the rotor core 31 of the example embodiment in that an outer side core portion is connected to an inner side core portion on one side thereof in a circumferential direction.

Figure 7:
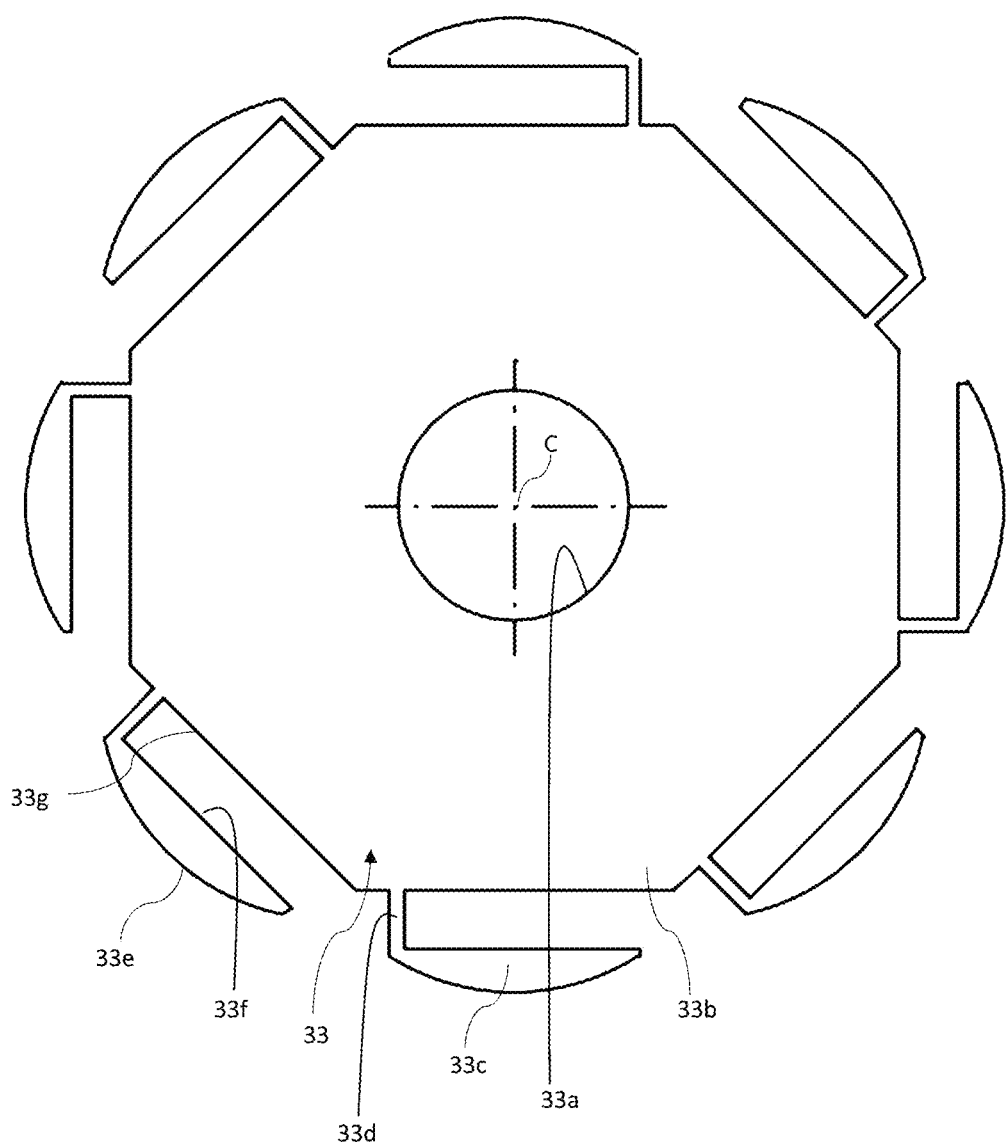
FIG. 7 is a plan view of a rotor core of a first modified example embodiment of the present disclosure.

FIG. 7 is a plan view of the rotor core 33 in the rotor according to one modified example of the present disclosure. Here, although the rotor core 33 viewed from an upper side in an axial direction will be described, the same shape is obtained even when viewed from a lower side in the axial direction. That is, as in the example embodiment, positions of top portions of outer side core portions 33c in an upper side and a lower side in the axial direction are deviated from each other in the circumferential direction. In the description below, a first outer side core portion viewed from the upper side in an axial direction and a second outer side core portion viewed from the lower side in the axial direction are collectively referred to as the outer side core portion 33c. Further, a first connection portion viewed from the upper side in the axial direction and a second connection portion viewed from the lower side in the axial direction are collectively referred to as a connection portion 33d.

As shown in FIG. 7, the rotor core 33 includes a shaft through hole 33a having a circular cross-section in a center portion with a central axis C as a center thereof. The rotor core 33 includes an inner side core portion 33b, the outer side core portion 33c, and the connection portion 33d.

The inner side core portion 33b includes an outer side surface 33g at an outside thereof in a radial direction. An inner side surface of a magnet 32 (not shown) is in contact with the outer side surface 33g. An inner side surface 33f of the outer side core portion 33c is in contact with an outer side surface of the magnet 32 (not shown).

The outer side core portion 33c is connected to the inner side core portion 33b on one side or the other side thereof in the circumferential direction. More specifically, the one side of the first outer side core portion 33C in the circumferential direction and the inner side core portion 33b are connected to each other by the first connection portion 33d. The other side of the second outer side core portion 33c in the circumferential direction and the inner side core portion 33b are connected to each other by the second connection portion 33d. By providing a configuration including the first and second connection portions 33d, it is not necessary to bond the inner side core portion 33b to the outer side core portion 33c. Also, the magnet 32 and the outer side core portion 33c may be prevented from scattering even when the rotor 3 rotates at high speed.

Further, in the one side of the rotor core 33 in the circumferential direction, the outer side core portion 33c is open without being connected to the inner side core portion 33b, so that the magnetic flux from the magnet 32 may be effectively utilized.

A rotor core 34 of the rotor of the present modified example is mainly different from the rotor core 31 of the example embodiment in that an outer side core portion is connected to an inner side core portion on one side and the other side thereof in a circumferential direction.

Figure 8:
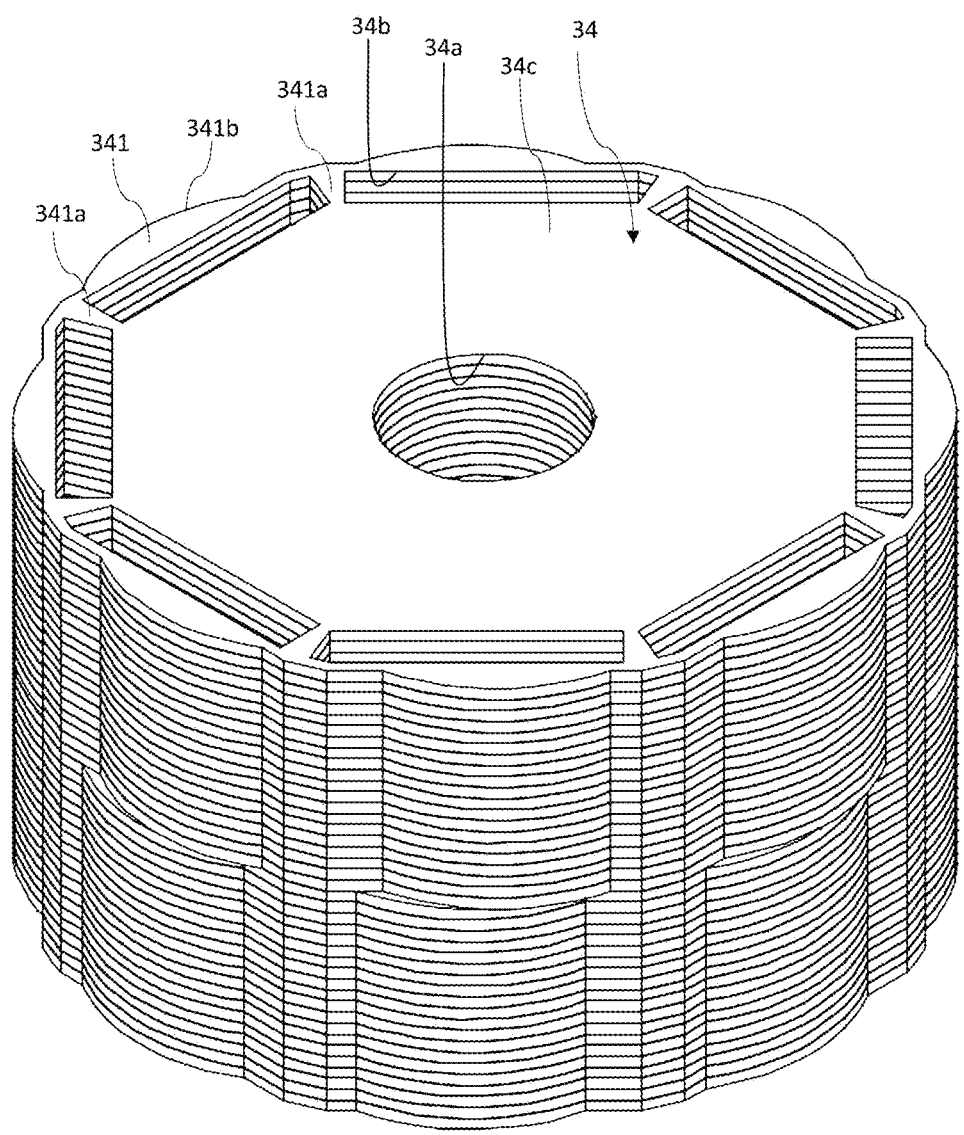
FIG. 8 is an external perspective view of an upper side of a rotor core of a second modified example embodiment of the present disclosure.
Figure 9:
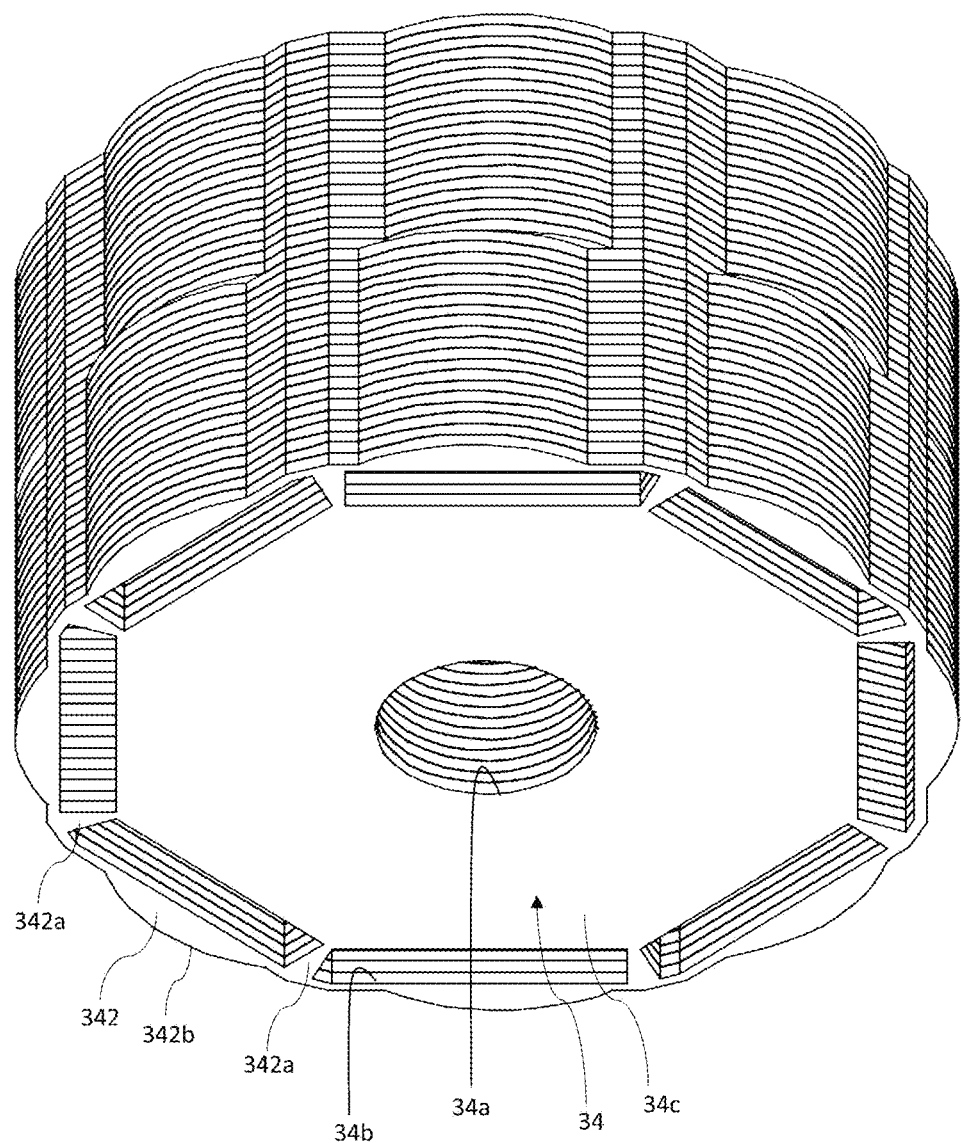
FIG. 9 is an external perspective view of a lower side of the rotor core of the second modified example embodiment of the present disclosure.
Figure 10:
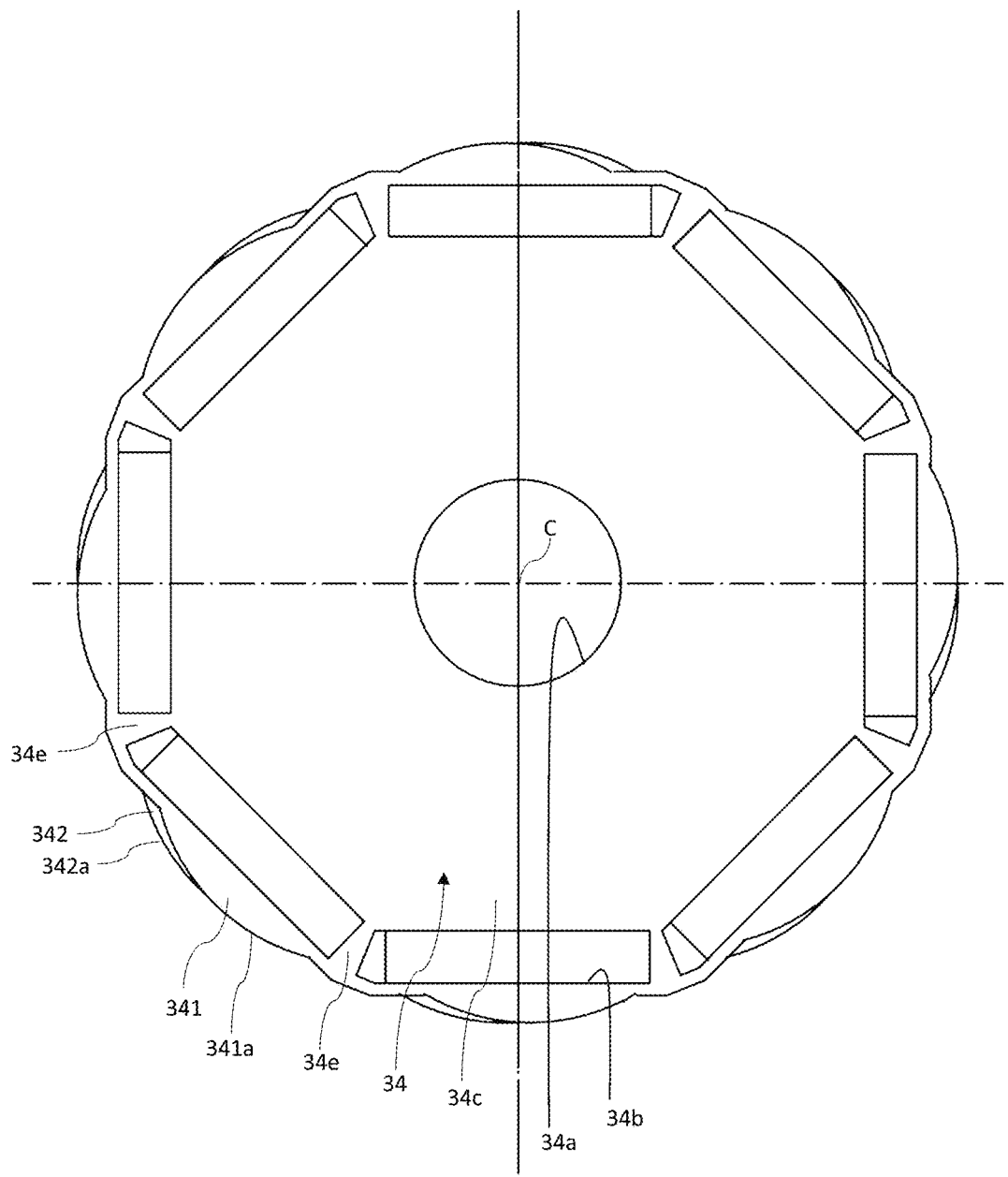
FIG. 10 is a plan view of the rotor core of the second modified example embodiment of the present disclosure.

FIGS. 8 and 9 are perspective views of the rotor core 34 in the rotor according to one modified example of the present disclosure. FIG. 8 is a diagram viewed from an upper side in an axial direction, and FIG. 9 is a diagram viewed from a lower side in the axial direction. FIG. 10 is a plan view of the rotor core 34 of the present modified example.

As shown in FIGS. 8 to 10, the rotor core 34 includes a shaft through hole 34a in a center portion with a central axis C as a center thereof. Further, the rotor core 34 includes a magnet through hole 34b into which a magnet 32 (not shown) is inserted. The rotor core 34 includes an inner side core portion 34c. As shown in FIG. 8, the rotor core 34 includes a first outer side core portion 341 and a first connection portion 341a. The first outer side core portion 341 includes a first outer side surface 341b on an outer side surface facing the stator 4. As shown in FIG. 9, the rotor core 34 includes a second outer side core portion 342 and a second connection portion 342a. The second outer side core portion 342 includes a second outer surface 342b on the outer surface facing the stator 4.

In a rotor having the rotor core 34 of the above-described configuration, the magnet 32, the first outer side core portion 341, and the second outer surface 342b may be more reliably prevented from scattering even when a motor having the rotor rotates.

In the rotor 3 of the example embodiment, a configuration may be adopted in which the curvature radii of the outer side surface 311a of the first outer side core portion 311 and the outer side surface 312a of the second outer side core portion 312 have shapes different from each other. In this configuration, a design may be provided in which the phases of the torque ripples generated by the first outer side core portion 311 and the second outer side core portion 312 while the motor 1 including the rotor 3 rotates are opposite to each other. With this configuration, the torque ripples generated while the motor 1 including the rotor 3 rotates cancel each other out between the first outer side core portion 311 and the second outer side core portion 312. Thus, the rotor 3 capable of configuring the motor 1 in which the torque ripples are reduced may be provided.

Meanwhile, a rotating body having an outer side surface with a small curvature radius has low cogging torque and excellent robustness. Thus, by disposing rotating bodies having outer side surfaces with a small curvature radius on one side in a circumferential direction in a rotational direction, a configuration having low cogging torque and excellent robustness may be provided.

Accordingly, in the above configuration in which the curvature radii of the outer side surface 311a of the first outer side core portion 311 and the outer side surface 312a of the second outer side core portion 312 have shapes different from each other, the curvature radius R1 of the outer side surface 311a of the first outer side core portion 311 that is one side in the circumferential direction in the rotational direction may be made smaller than the curvature radius R2 of the outer side surface 312a of the second outer side core portion 312 that is the other side in the circumferential direction in the rotational direction. In this case, the outer side surface 312a is curved more gently than the outer side surface 311a. With such a configuration, the rotor 3 capable of configuring the motor 1 having low cogging torque may be provided.

Further, when the rotor 3 rotates, the first outer side core portion 311 or the second outer side core portion 312 reaching a predetermined position in the circumferential direction first is referred to as "one side" in the circumferential direction, and the first outer side core portion 311 or the second outer side core portion 312 subsequently reaching the predetermined position in the circumferential direction is referred to as "the other side" in the circumferential direction. Also, in the present specification, for convenience of description, a predetermined angle at which the second outer side core portion 312 deviates to one side in the circumferential direction with respect to the first outer side core portion 311 is referred to as an "advance side", and a predetermined angle deviated to the other side in the circumferential direction is referred to as a "retard side".

Figure 11:
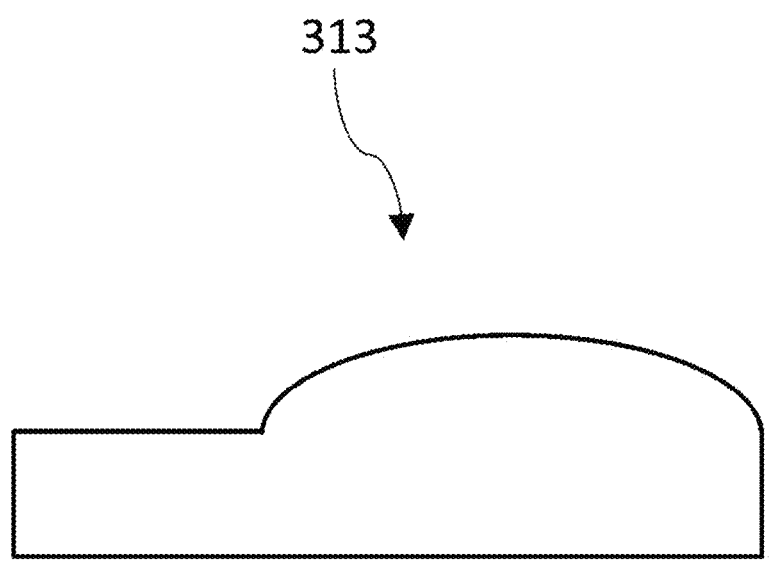
FIG. 11 is one example of a plan view of an outer side core portion of a modified example embodiment of the present disclosure.
Figure 12:
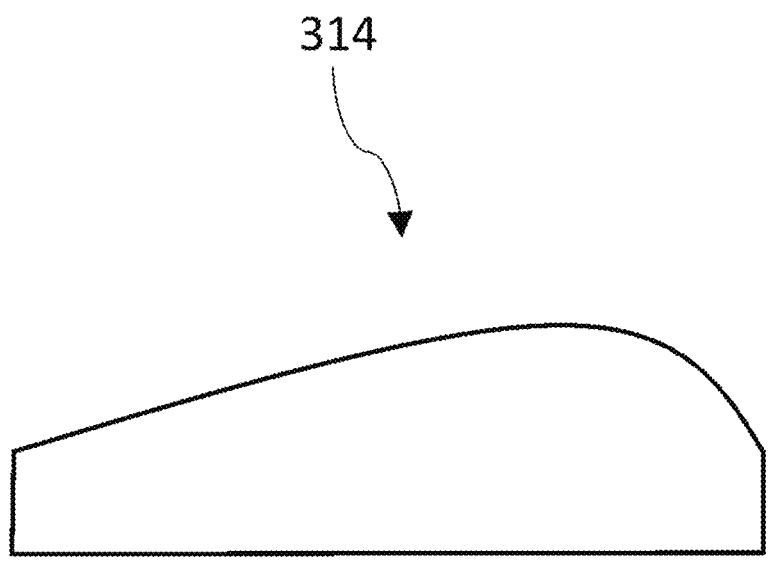
FIG. 12 is one example of a plan view of an outer side core portion of a modified example embodiment of the present disclosure.
Figure 13:
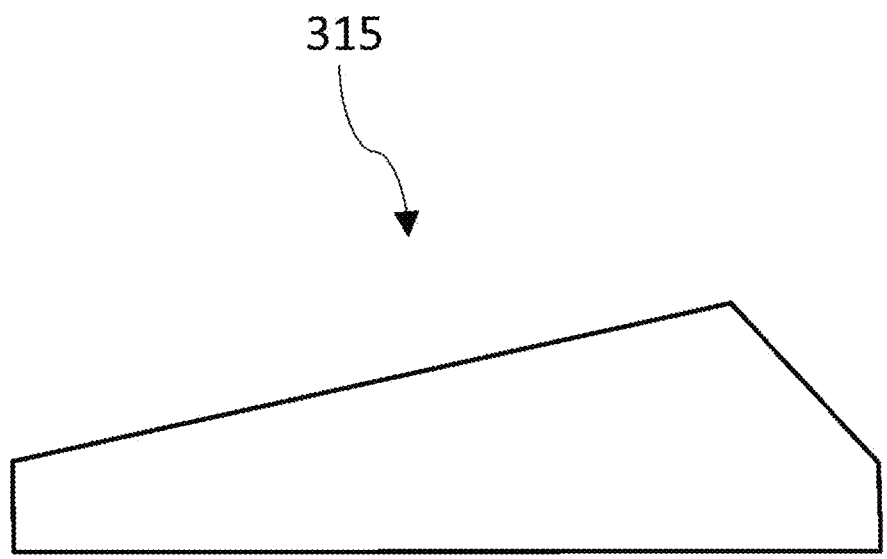
FIG. 13 is one example of a plan view of an outer side core portion of modified example embodiment of the present disclosure.

In the example embodiment, the outer side surface 311a of the first outer side core portion 311 and the outer side surface 312a of the second outer side core portion 312 may not necessarily have to be a curved surface having a circular arc shape, and any other shapes may be adopted. Outer side core portions 313, 314, and 315 shown in FIGS. 11 to 13, respectively, are examples of plan views of the first outer side core portion and the second outer side core portion.

Further, a configuration in which a third outer side core portion is further included in addition to the first outer side core portion 311 and the second outer side core portion 312 may be provided. That is, the present disclosure is not limited to the configuration including two outer side core portions, and a configuration in which three or more outer side core portions are included may be provided. In this case, positions of the plurality of outer side core portions may be configured to be deviated from each other in the circumferential direction.

Heretofore, the specific description of the example embodiment and the modified examples of the present disclosure has been made. In the above description, the description is merely one example embodiment, and the scope of the present disclosure is not limited to the one example embodiment and may be broadly interpreted to a range that can be grasped by those skilled in the art. For example, the example embodiment and the modified examples may be implemented in combination with each other.

The present disclosure may be used for, for example, a motor mounted on a vehicle such as for electric power steering, a pump, a compressor, or the like.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
    a rotating body arranged along a central axis; wherein
    the rotating body includes a rotor core having a cylindrical shape with the central axis as a center thereof and a plurality of magnets arranged in a circumferential direction;
    the rotor core includes an inner side core portion positioned farther inward than the magnet in a radial direction, a first outer side core portion positioned farther outward than the magnet in the radial direction and disposed on a first side in an axial direction, and a second outer side core portion positioned farther outward than the magnet in the radial direction and disposed on a second side in the axial direction;

a distance between the central axis and an outer side surface of the first outer side core portion changes in the circumferential direction;

a distance between the central axis and an outer side surface of the second outer side core portion changes in the circumferential direction;

in a plan view, positions of a top portion of the outer side surface of the first outer side core portion, which is a farthest distance from the central axis, and a top portion of the second outer side core portion, which is a farthest distance from the central axis, in the circumferential direction are different from each other;

the rotor core includes a first connection portion connecting the inner side core portion to the first outer side core portion, and a second connection portion connecting the inner side core portion to the second outer side core portion;

a first end of the first outer side core portion in the circumferential direction is connected to the inner side core portion by the first connection portion;

a second end of the first outer side core portion in the circumferential direction is not connected to the inner side core portion;

a first end of the second outer side core portion in the circumferential direction is connected to the inner side core portion by the second connection portion; and a second end of the second outer side core portion in the circumferential direction is not connected to the inner side core portion.

2. The rotor of claim 1, wherein the magnet has a rectangular or substantially rectangular parallelepiped shape.

3. The rotor of claim 1, wherein the top portion of the first outer side core portion is disposed on a first end side from a center of the magnet in the circumferential direction, and the top portion of the second outer side core portion is disposed on a second end side from the center of the magnet in the circumferential direction.

4. The rotor of claim 1, wherein lengths of the first outer side core portion and the second outer side core portion in the circumferential direction are shorter than a length of the magnet in the circumferential direction, respectively, the first outer side core portion overlaps a first side end of the magnet in the radial direction, and the second outer side core portion overlaps a second side end of the magnet in the radial direction.

5. The rotor of claim 1, wherein in a plan view, a shape of the first outer side core portion viewed from a first side in the axial direction is the same as a shape of the second outer side core portion viewed from a second side in the axial direction.

6. A motor comprising:

a shaft, to which the rotor of claim 1 is attached, extending along the central axis in a vertical direction;

a bearing rotatably supporting the shaft;

a stator facing an outer side of the rotor in a radial direction; and a housing accommodating the rotor and the stator.

7. The rotor of claim 1, wherein each of the outer side surfaces of the first outer side core portion and the second outer side core portion is curved in a circular arc shape in a plan view, and a curvature radius of the outer side surface of the first outer side core portion is different from a curvature radius of the outer side surface of the second outer side core portion.

8. The rotor of claim 7, wherein the curvature radius of the outer side surface of the first outer side core portion is smaller than the curvature radius of the outer side surface of the second outer side core portion, and in a rotational direction of the rotor, the top portion of the first outer side core portion is disposed on one side from the top portion of the second outer side core portion in the circumferential direction.

* * * * *